United States Patent Office 3,304,276
Patented Feb. 14, 1967

3,304,276
POLYHYDRIC PHENOL MODIFIED FATTY MEDIA AND IRON SURFACES CHELATED THEREWITH
Raymond Noel Faulkner, Hanworth, Middlesex, and Leonard Alfred O'Neill, Hampton Hill, Middlesex, England, assignors to the United States of America as represented by the Secretary of Agriculture
No Drawing. Filed May 13, 1964, Ser. No. 367,262
21 Claims. (Cl. 260—22)

A nonexclusive, irrevocable, royalty-free license in the invention herein described, throughout the world for all purposes of the United States Government, with the power to grant sublicenses for such purposes, is hereby granted to the Government of the United States of America.

This invention relates to metal-reactive primer-type coatings comprising gallate, tannate, or pyrogallol modified vegetable oils, vegetable oil fatty esters, and alkyds, glycol ether solutions of which novel unpigmented primers react in situ with unoxidized iron and steel surfaces to form diffusible organometallic complexes that leave the metal surface and effect curing of the coating to hard, adherent, water resistant, durable films containing residual phenol groups. This invention also relates to metal-reactive polyhydric phenol-modified short oil and long oil alkyds that cure even at room temperature to rust inhibiting, essentially non-blistering, and durable finishes that can be further improved by stoving at 140° C.

British patent 826,564 teaches that the addition of an unmodified tannin extract to linseed-containing coatings prevents the extensive rusting that occurs when ordinary linseed coatings are applied to iron or steel. British Patent No. 826,566 teaches that corrosion inhibition can be obtained by applying a tannin extract to iron or steel prior to applying a drying oil. U.S. 3,074,983 teaches that fatty acids containing at least one hydroxy phenol side chain have antioxidant and anticorrosive properties. Roe et al., JOACS 36: 656 (1959), and Ault et al., ibid. 39, 132 (1962), prepared lubricant additives comprising monohydroxyphenol derivatives of oleic acid. Our copending application S.N. 302,493, filed August 13, 1963, now U.S. Patent No. 3,258,475, teaches that the film properties of alkyd resins are improved by adding to an organic solvent solution thereof a solution containing about 5 to 10 percent based on the weight of the alkyd of the organometallic complexes obtained by interesterifying unsaturated fatty alcohols with metallic acetoacetate complexes. However, these coating compositions do not contain "built-in" antioxidant groups, and alkyd formulations containing the pre-formed chelates of the invention are still quite prone to blister and to form rust beneath the film.

One object of our invention is the preparation of dihydric or trihydric phenol derivatives of the esters of vegetable oil type long chain unsaturated fatty acids as well as of the corresponding derivatives of unsaturated triglycerides and of oil modified alkyds by reaction with polyhydric phenols, e.g., methyl or propyl gallate, tannins, or pyrogallol.

Another object is a catalysed reaction for readily obtaining the above esters in commercially attractive yields.

Still another object is a process for curing nondrying alkyds at ambient temperature by introducing polyhydric phenol groups capable of in situ formation of diffusible organometallic complexes with a ferrous surface.

Another object is the discovery of conditions under which our novel polyhydric phenol-modified fatty media form cross-linking amounts of Fe complexes.

The above and related objects of our invention will be made clearer by reference to the following specification and claims.

We have now discovered that reactive dihydric or trihydric phenol groups can be introduced into fatty media containing unsaturated and/or hydroxyl groups in attractive yields by reacting a polyhydric phenol reactant, preferably in several fold excess in the case of an unsubstituted polyhydric phenol compound with a fatty medium in the presence of a catalytic amount of titanium isopropoxide which becomes homogeneously incorporated via reaction with the medium. We have also found that an acid activated montmorillonite earth is satisfactory, a particular advantage in its use compared with titanium isopropoxide being that the unreacted polyhydric phenol is recoverable in a purer form, a partial disadvantage being some difficulty in removing the fine particles of catalyst after the reaction. Representative polyhydric phenol reactants include the highly refined natural or the condensed tannins, methyl or the preferred propyl gallate, catechol, and pyrogallol. The resulting polyhydric phenol-containing oil based products when applied in certain water-miscible glycol ether co-solvents form highly diffusible in situ organometallic, i.e., Fe/polyhydric phenolic chelate complexes with a clean ferrous surface in the presence of atmospheric oxygen and moisture, which in situ complexes are not only capable of curing thin films of the polyhydric phenol-modified oil based primer-type media including alkyds but especially because of their unexpected solubility and diffusibility in the glycol ether vehicle are also capable of producing a beneficially uniform, room temperature cure of the oil based media to a water resistant tack-free film while preserving the antioxidant activity of the polyhydric phenol groups, thus particularly diminishing the known blistering and corrosive tendencies of oil modified alkyds applied to unoxidized iron or mild steel surfaces. Without wishing to be held strictly accountable for the accuracy of the mode of operation of our invention, we believe that the anticorrosive protection that we achieve can be mainly accounted for by the formation of highly cross linked water (blister) resistant Fe-complex coatings formed initially by reaction at anodic sites, thus resulting in excellent adhesion of the coating to the surface of the mild steel, which together with the high water resistance of the coating inhibits electrochemical attack. While the degree of protection afforded by any particular medium apparently depends mainly on the extent to which it reacts in situ with the mild steel, the presence of antioxidant groups (including both unreacted polyhydric phenol groups in the medium and phenolic groups in the Fe-complex coating) may also contribute to the corrosion resistance by inhibiting autoxidative degradation of the unsaturated fatty groups and a consequent breakdown of the coating. Suitable water-miscible solvents having the required volatility are ethylene glycol monoethyl ether and diethylene glycol butyl ether, the former somewhat more volatile compound generally resulting in somewhat harder cured films than the latter. We have found that the aforesaid solvents are critical to the in situ formation of more than ineffective traces of the iron-containing complexes, to the deposition of a primer coating that is highly fluid and therefore less than 0.5 mil in thickness, to the rapid and uniform diffusion of the complex therein, and to the resulting room temperature cure to a tack-free film. When the solvent is more volatile than ethylene glycol monoethyl ether the extent of formation of Fe complex is reduced; with a less volatile solvent formation of a complex is enhanced, but the solvent retained in the coating produces a softening effect. When films are deposited from a water-immiscible solvent or from bulk, little or no Fe complex is formed. For example, no Fe complex was formed when gallate-modified fatty media were cast in bulk (without solvent) or clean mild steel panels nor when ethanol, benzene, xylene, chloroform, amyl acetate, diethyl sebacate, or dibutyl ether were tried as solvents, the blue-black coloration of the Fe complex not appearing and the films remaining tacky. The diethylene glycol monobutyl ether gives somewhat softer films than the ethylene glycol ethyl ether because of its lower volatility. With ethylene glycol monoethyl ether, maximum Fe complex developed in 15–30 minutes, and the gallate-modified films became tack-free in about 1 hour. A limited amount of the blue-black complex formed on somewhat rusty (partially oxidized) steel in the presence of oxygen and moisture, but none formed on fully rusted iron or steel or on other metal surfaces, e.g., galvanized iron, copper, aluminum.

The amount of the ether solvent to be employed is such that the polyhydroxy phenol fatty medium dissolved therein comprises about 20–40 percent of the solution, preferably the lower value. A 40 percent solution of the castor oil gallate of Example 3 in ethylene glycol monoethyl ether gave patchy black films, presumably because of poor wetting. This was overcome by lowering the castor oil gallate concentration to 25 percent, and the formation of Fe complex was then further increased by adding acetic acid (about 1 percent based on the glycol ether). An approximately 45 percent solution of the gallate modified alkyd of Example 5 in ethylene glycol monoethyl ether gave an uneven coating due to phase formation. This was prevented by adding a small amount of high boiling, aromatic rich naphtha, and the extent of Fe complex formation was visibly increased by the addition of the aforesaid small proportion of acetic acid.

It should be pointed out that excepting in the case of the gallate-modified linseed-tung-phthalic-glycerol alkyd or the corresponding pentaerythritol alkyd, the residual antioxidant activity present in unstoved Fe-complex primer coats based on the other gallate modified media we have so far investigated and on media modified with the other polyhydric phenols inhibit the drying of subsequently applied drying oil paints containing "unreactive" pigments such as $TiO_2$ or $Fe_2O_3$ though not of drying oil media containing a "reactive" pigment such as zinc chromate. Thus, while the above mentioned gallate-modified primers can be used without stoving regardless of the type of pigment present in the subsequently applied paint, the other primers must be stoved prior to the application of a paint containing an "unreactive" pigment. This highly important advantage of the unstoved Fe complexes formed from the said gallate-modified media may be explained on the ground that with reasonable aging the said films become very highly cross linked and very hard whereas the unstoved Fe complex coatings formed from the other gallate modified media and from media modified with other polyhydroxy phenols cure less strongly and therefore possess a relatively softer upper layer, which is presumably then further softened by the constituents of the paint top coat, thus giving rise to the antioxidant and cure-inhibiting effects. Thus, unless stoving is resorted to or the above gallate-modified drying oil media is used, the presistent antioxidant activity limits the choice of a top coat paint to one containing a "reactive" pigment.

Pretreatment of the mild steel surface by pickling in HCl or citric acid produced no detectable differences in complex formation over that obtained on emery paper abraded or shot blasted mild steel surfaces.

Attempts to enhance the formation of Fe complex by addition of naphthenates or peroxides to the polyhydric phenol modified fatty media prior to application to the metal surface adversely affected the formation of the Fe complex and cure.

As indicated above, the yield of polydric phenol modified fatty product is negligible in the case of an unsubstituted polyhydric phenol reactant unless at least about one equivalent excess of the trihydric phenol is employed, whereas with the gallate ester reactants good yields are obtained using equivalent amounts. With respect to the introduction of polyhydric phenol groups via reaction of the corresponding polyhydric phenol reactants with fatty unsaturation we have found that both center double bonds of the type found in vegetable oils and terminal fatty double bonds are reactive, conjugated unsaturation being particularly reactive. Also, the alcoholysis reaction which occurs between gallate ester-reactants and fatty media containing hydroxyl groups does not proceed in the absence of a suitable catalyst. We have found perchloric acid to be active but unsuitable because it chars the product; trichloracetic acid was found to be inactive; acid treated finely divided montmorillonite (aluminum silicate clay) is active but relatively less efficient than the preferred titanium isopropoxide. We have found both catalysts to be efficient in promoting the reaction between polyhydric phenols broadly and the herein indicated types of fatty unsaturation.

Typical evaluations comprised one or more of the following tests: resistance to immersion in cold 1 percent aqueous sodium hydroxide (4 to 48 hours) and in gently boiling 0.2 percent aqueous sodium hydroxide (15 min. or 1 hour); accelerated weathering by up to 1000 hours exposure to a carbon arc with intermittent spraying of water; hardness by scratching with a 1 mm. diameter ball point under varying loads or by measuring the rate of damping of a pendulum placed on the test panel; resistance to 4 percent aqueous salt spray in a closed box at room temperature on coated panels scratched to the metal in the form of a cross, the panels being set at about a 15° angle from the vertical; intercoat adhesion between top and primer coats following knife scratch to primer coat; resistance to 100 percent humidity at 45–50° C.; resistance to $SO_2$ atmosphere (British Standards Institution, 1931 method) comprising determination of rust by weight loss in concentrated HCl containing 5 percent $SnCl_2$ and 2 percent $Sb_2O_3$ after 5 days exposure to the $SO_2$ vapor; and resistance to 48 hours exposure to $NH_3$ vapors from a 2 percent solution of 0.88 percent ammonia. The properties of the resulting films could generally be improved in many respects by stoving at 140° C. for 1 hour. Table I and its continuation (Table II) show the results of tests on films of the gallate-modified castor alkyl of Example 11. These are typical for the products from non-drying hydroxylated alkyds while Tables III and IV showing the evaluations of methyl pyrogallyl undecanoate coatings are fairly typical of the results with the polyhydric modified fatty acid esters. Table V shows the compatibility of Fe gallate-modified alkyl complex coatings with alkyd and other top-coats containing pigments. The unstoved Fe complex coating formed from the gallate modified linseed-tung-phthalic-glycerol alkyd, or the corresponding pentaerythritol alkyd, showed no inhibition of drying oil type top coats, but in other respects, the results given in Table V apply. Table VI shows the compatibility of the gallate modified castor alkyd with other polymers. However, we point out that the results given in Table VI are not strictly representative of all gallate/alkyds inasmuch as we have just now found that the gallate modified linseed/tung alkyd is compatible with chlorinated rubber, and we are further evaluating this system. Table VII shows the properties of the Fe gallate-modified castor oil coating, which properties are representative for the correspondingly modified hydrogenated castor oil. Table VIII shows the evaluation of coatings of the Fe gallate-modified linseed-tung-phthalic-glycerol alkyd. The results were quite typical of those obtained with a gallate modified linseed/tung/phthalic/pentaerythritol alkyl that in some respects is typical of a dehydrated castor/phthalic/glycerol alkyd, a linseed/phthalic/glycerol alkyd, and a soya/isophthalic/pentaerythritol alkyd. Table IX shows the evaluation results of the Fe complex formed from pyrogallol-modified dehydrated castor oil. These results with a pyrogallol-modified conjugated drying oil are representative to some extent of those of the pyrogallol-modified tung oil. Table X sets forth the evaluation results of Fe pyrogallol-modified (non-conjugated) linseed oil coatings after stoving at 140° C. for 1 hour, no tests being possible on the unstoved coatings which remain tacky. These results are quite typical of those obtained by substituting unconjugated soybean oil.

It will be understood that in the following examples there may well be isomers and that the precise position of the polyhydroxy phenol group substituents are unknown.

*Example 1*

Highly pure methyl gallate 18 g. (0.1 mole), M.P. 200° C., that had been dried at 120° C. for several hours to remove water of crystallization and 27 g. (0.1 mole) octadecanol contained in a flask fitted with a short distillation head and receiver were heated in an oil bath at 220°–250° C. until a homogeneous melt was obtained. The flask was briefly removed from the bath to permit adding about 0.1 ml. titanium isopropoxide catalyst with shaking. Heating was then continued at 220° C. for 2 hours during which time 2.8 ml. of methanol distillate was collected corresponding to 70 percent of theoretical reaction. The crude octadecyl gallate (42 g.) melting at 83°–87° C. was completely soluble in chloroform, indicating the absence of unchanged methyl gallate. Purification of 28 g. of the crude by extraction with cyclohexane provided 25 g. of essentially pure octadecyl gallate melting at about 90° C. Films from a 20 percent solution in ethylene glycol monoethyl ether dried on mild steel to a relatively soft, waxy blue-black coating having poor adhesion.

*Example 2*

Oleyl gallate was prepared by reacting methyl gallate and oleyl alcohol in the manner of Erample 1, the reaction going to only 70 percent of theory. No attempt was made to purify the oleyl gallate product.

*Example 2a*

A mixture of 11 g. (0.05 mole) propyl gallate and 13.5 g. (0.05 mole) oleyl alcohol was heated at 235° C. in the presence of about 0.15 g. acid-activated montmorillonite earth as alcoholysis catalyst in place of titanium isopropoxide for about 3 hours. About 2 g. of distillate, mainly propyl alcohol, was collected indicating about 60–70 percent interchange. The dark colored residue was separated by extraction with chloroform to give 0.4 g. of solids, comprising the catalyst and unreacted propyl gallate, and a solution containing crude oleyl gallate.

*Example 3*

A mixture of castor oil, 21 g. (approx. 0.02 mole) and methyl gallate, 10 g. (0.055 mole) was heated for 1½ hours at 200°–230° C. in the presence of 0.1 ml. titanium isopropoxide. A distillate (ca. 1.5 g.) representing about equal parts of water and methanol was collected in the receiver. Extraction of the non-volatile crude with three 50 ml. portions of petroleum ether (boiling range 40–60° C.) gave a liquid extract (4 g.) and a residue which was extracted with four 100 ml. aliquots of hot 30 percent aqueous ethanol solution to give 2 g. of unreacted methyl gallate (solid) and 21.5 g. of gallate-modified castor oil. Alternatively the petroleum ether insoluble residue was extracted with chloroform or toluene, the solution filtered to remove unreacted methyl gallate and the gallate modified oil then recovered from the filtrate. In the form of a 40 percent solution in ethylene glycol monoethyl ether the product yielded patchy black, tacky films on mild steel. When the concentration of the gallate-modified castor oil was lowered to 25 percent, the coating was uniform and it dried rapidly to a fairly hard tack-free state. This was further improved by the prior addition of 1 percent acetic acid based on the glycol ether. The corresponding hydrogenated castor product cured to a relatively soft waxy blue-black film.

*Example 4*

A mixture of 24 g. linseed oil and 12 g. propyl gallate was heated to obtain a homogeneous mixture, cooled and 0.1 ml. titanium isopropoxide then added. The mixture was heated for about 4 hours at 210–20° C., a small amount of distillate being collected. The non-volatile residue was dissolved in 150 ml. toluene and the solution cooled to 5° C. overnight. Unreacted propyl gallate (3 g.) was filtered off, and 30 g. of a dark viscous oil recovered from the filtrate. Coatings applied to mild steel from solution in ethylene glycol mono ethyl ether gave a tacky Fe complex coating, the reaction being enhanced somewhat by the addition of about 1 percent acetic acid.

*Example 5*

72 g. of a linseed/tung/phthalic/glycerol alkyd having a hydroxyl value of 6 and characterized by a phthalic acid content of 27 percent and a fatty acid content of 58 percent was heated for 2 hours at 220°–230° C. with 13 g. methyl gallate in the presence 0.1 ml. titanium isopropoxide. As expected from the low hydroxyl value of the alkyd, no byproduct methanol was obtained. The reaction product was extracted with three 100 ml. portions of hot 95 percent ethanol. The combined extracts were diluted with water to an ethanol concentration of about 30–35 percent, causing an oil to be deposited from solution. Decantation of the aqueous ethanol phase and evaporation gave about 6.6 g. of a solid. The combined aqueous alcohol-insoluble material was separated from 1.9 g. of gel by dissolving in xylene, which upon removal by distillation yielded 75.6 g. of a dark, viscous product whose solubility in xylene or benzene indicated the absence of methyl gallate. This gallate-modified alkyd was immiscible with ethylene glycol monoethyl ether, and blotchy blue films were obtained on mild steel. This defect was overcome by adding xylene or highly aromatic naphtha to maintain a single phase, and the extent of in situ complex formation on a mild steel surface was greatly improved by the addition of about 1 percent acetic acid based on the glycol ether before application. The coating dried to a blue-black tack-free hard film having excellent adhesion.

*Example 6*

25 g. of isomerized safflower oil were heated with 9 g. propyl gallate at 210–15° C. for 4 hours using titanium isopropoxide as catalyst. A small amount of distillate was collected. Extraction of the non-volatile residue with petroleum ether gave 9 g. of a soluble fraction comprising mainly unreacted safflower oil and an insoluble fraction which was further subdivided by extraction with 250 ml. xylene into 1.5 g. unreacted propyl gallate (M.P. 140°–5° C.) and 22.4 g. of a xylene soluble product corresponding to the gallate modified oil.

*Example 6a*

(This covers the use of aluminum isopropoxide as catalyst.)

26 g. of isomerized safflower oil and 12 g. of propyl gallate were reacted as described in Example 6, using 0.14 of aluminum isopropoxide in 15 ml. xylene as catalyst. Extraction with 200 ml. xylol yielded 1.5 g. crude propyl gallate and a solution containing 36 g. of the gallate modified oil.

*Example 7*

57.2 g. of dehydrated castor oil, having a viscosity of 1.5 poiser and 50 percent conjugated diene content, and 51.0 g. of pyrogallol were heated to obtain a homogeneous mixture. 5 g. of acid activated montmorillonite earth were then added and the reaction mixture heated at 220–230° C. with constant stirring for about 1½ hours under nitrogen. 11 g. of unreacted pyrogallol was removed by repeated extraction of the product with warm water. The product (about 90 g.) was a sticky, black oil, which was insoluble in petroleum ether. A tack free, adherent, blue-black Fe complex coating was formed in situ on mild steel by deposition of the product from ethylene glycol monoethyl ether solution. The properties of the coating were greatly improved by stoving at 140° C. for 1 hour.

(The corresponding reaction with tung oil requires limiting the reaction temperature to about 150° C. to avoid gelation.)

Example 8

Linseed oil (38.3 g.) pyrogallol (32 g.) and acid activated montmorillonite (3 g.) were reacted under the same conditions employed for the dehydrated castor oil-pyrogallol reaction of Example 7; 13 g. unreacted pyrogallol were removed by extraction with water, and about 4 g. of a soluble oil, having characteristics similar to linseed oil, by extraction with petroleum ether. About 50 g. of a viscous, dark brown, petroleum ether insoluble liquid was obtained which gave a blue-black tacky coating on steel from ethylene glycol monoethyl ether solution. After stoving at 140° C. for 1 hour this gave an adherent and extremely blister resistant coating.

Example 9

Linseed oil (29.2 g.) and pyrogallol (26.5 g.) were heated at 220° C. for 1 hour in the presence of 0.3 g. titanium isopropoxide as catalyst in place of the acid activated earth. The reaction mixture was worked up as described in the previous example. The viscous, dark colored, petroleum ether insoluble product gave a blue-black tacky film on mild steel from ethylene glycol monoethyl ether solution, which was considerably improved by stoving at 140° C. for 1 hour.

Example 10

Methyl undecenoate (39.2 g.), pyrogallol (61.1 g.) and acid treated montmorillonite (5 g.) as catalyst in place of titanium isopropoxide (Example 20) were heated with stirring at 220° C. for 1½ hours and the product (58 g.) purified as described for the methyl pyrogallyl stearate of Example 19. After removal of unreacted methyl undecenoate (1.6 g.), as a petroleum ether extract, molecular distillation (11 g.) gave a viscous yellow oil (5 g.), $n_D^{22}$ 1.5160, which formed a blue-black Fe complex on steel with properties identical to those given in Table III.

Example 11

A homogeneous mixture consisting of 140 g. of a commercial castor oil/phthalic/glycerol alkyd having a hydroxyl value of 150, a phthalic acid content of 41 percent and fatty acid content of 45 percent and 26.5 g. (0.147 mole) of methyl gallate was heated at 220°–230° C. for 2½ hours in the presence of 0.15 ml. titanium isopropoxide, 2.5 g. of distillate composed of about equal parts of water and methanol being collected. The residual product was extracted with four 100 ml. portions of hot 30 percent aqueous ethanol which upon removal of the solvent yielded a total of 2.5 g. of unreacted crude methyl gallate. Residual alcohol and water were distilled from the gallate-modified alkyd at 100° C./1 mm. Hg. The final product was initially soluble in chloroform, but on standing at 5° C. for a few days about 6 g. of additional crude methyl gallate precipitated from solution. The castor alkyd gallate deposited on clean mild steel from a 25 percent solution in ethylene glycol monoethyl ether dried to a blue-black tack-free hard coating having excellent adhesion.

Example 12

A mixture of 36 g. of the linseed/tung/phthalic/glycerol alkyd of Example 5, as a solution in 24 g. xylol, and 6 g. propyl gallate was heated up to 210° C. under reflux for a few minutes to obtain a homogeneous solution and then cooled momentarily while 0.1 ml. titanium isopropoxide in 15 ml. xylol was added with shaking. The reaction was continued at 210° C. for about 4 hours with fairly frequent shaking. As an alternative method of separating unreacted propyl gallate the reaction product was dissolved in 250 ml. xylol. No precipitation occurred on standing overnight. The xylol was distilled off, finally under vacuum to give a gummy product (40 g.) which was dissolved in a mixture of 50 ml. ethylene glycol monoethyl ether and 50 ml. high boiling naphtha containing 1 ml. acetic acid to enhance the insitu formation of Fe complex coating on mild steel. The Fe complex coatings were hard with excellent adhesion.

Example 13

35.75 g. of a linseed-tung-phthalic-pentaerythritol alkyd in 30 ml. xylol and 6 g. of propyl gallate were reacted together for 4 hours as in Example 12 above in the presence of 0.1 g. zirconium tetraisobutoxide. Extraction with 250 ml. xylene yielded 3.2 g. unreacted propyl gallate (M.P. 147° C.) and a xylene soluble fraction which was much lighter in color than that obtained using titanium isopropoxide as catalyst. The latter fraction formed a blue-black Fe complex coating on mild steel from its solution in ethylene glycol monoethyl ether and high boiling aromatic naphtha, similar in properties to that noted in Example 12.

Example 14

50 g. of a lauric/phthalic/glycerol alkyd having a hydroxyl value of 137 and containing 46 percent phthalic and 31 percent fatty acid was heated with 18 g. methyl gallate at 220°–240° C. for 2 hours in the presence of 0.2 ml. titanium isopropoxide. About 0.4 g. of impure methyl alcohol distilled off. The reaction product was extracted with three 100 ml. portions of hot 30 percent aqueous ethanol. The inextractable residue was pumped free of solvent to give 56.5 g. of a dark, viscous resin that was completely soluble in chloroform, indicating the absence of unchanged methyl gallate. Coatings applied to mild steel from a 25 percent solution in ethylene glycol monoethyl ether cured to blue-black brittle films having poor adhesion.

Example 15

Methyl catechyl stearate was prepared by heating 18 g. (0.06 mole) of methyl oleate, 33 g. (0.3 mole) of catechol, and 0.2 ml. titanium isopropoxide at 230° C. for 1½ hours in a 500 ml. round-bottomed flask equipped with an air condenser through which a slow stream of nitrogen was admitted. After cooling the reaction product to just above ambient temperature, the excess catechol was removed in 100 ml. of added water. The crude product was added with stirring to a boiling solution consisting of 214 g. urea in 430 ml. methanol. After cooling to room temperature, the precipitated methyl oleate-urea complex was filtered off. The filtrate was concentrated, washed with water, and distilled to remove all the methanol. The product, 21 g. was obtained as a dark red oil. Molecular distillation at 200° C./10⁻³ mm. gave 13 g. of a pale yellow viscous oil, $n_D^{14}$ 1.5036; mol. wt. 399; active hydrogen (Zerevitinoff) 2.1 (cald.: mol. wt. 406; active hydrogens 2.0), and 8 g. of a non-volatile phenolic residue. On application to mild steel of a 40 percent solution in ethylene glycol monoethyl ether a blue-black complex quickly formed but composition apparently was too concentrated and the film remained tacky.

Example 16

Methyl catechyl undecanoate was prepared by reacting 11.8 g. (0.06 mole) methyl 10-undecenoate, 21.7 g. (0.20 mole) of catechol, and 0.1 ml. titanium isopropoxide at 220° C. for 1 hour in the apparatus of Example 15. Molecular distillation yielded 12.2 g. of a pale yellow oil with a molecular weight of 355 and 6.2 g. of non-volatile residue. Cald. for methyl catechyl undecanoate, mol. wt.=310.

Example 17

Methyl catechyl linoleate was prepared by reacting 10.4 g. (0.03 mole) mixed linseed methyl esters, 19.9 g. (0.18 mole) catechol, and 0.1 ml. titanium isopropoxide as in Example 16. Molecular distillation of the crude product gave 4.2 g. of a pale yellow oil, $n_D^{15}$ 1.5062; mol. wt. 367; active hydrogen (Zerevitinoff) 1.9. Calcd. for methyl catechyl linoleate; mol. wt. 404; active hydrogen atoms 2.0.

*Example 18*

Methyl-β-eleostearate 9 g. (0.03 mole), catechol 18 g. (0.16 mole), and titanium isopropoxide 0.1 ml. were heated at 130° C. for 20 minute in the flask of Example 16. Molecular distillation at 200° C. and $10^{-3}$ mm. of the catechol-free crude (7.8 g.) yielded 1.9 g. of a pale yellow oil, $n_D^{14}$ 1.5180; mol. wt. 340; active hydrogen atoms (Zerevitinoff) 2.6. Calcd. for methyl catechyl linoleate: mol. wt. 402; active hydrogen atoms 2.0. Films from a 40 percent solution in ethylene glycol monoethyl ether remained tacky.

methyl pyrogallyl stearate. Molecular distillation (14 g.) at 200° C. and $10^{-3}$ mm. gave a bright red oil (5.9 g.); $n_D^{20}$ 1.5112; mol. wt. 388; active hydrogen atoms (Zerevitinoff) 2.8. Calcd. for methyl pyrogallyl undecanoate: mol. wt. 326; active hydrogen atoms 3.0. Films applied as in Example 19 dried rapidly and were harder than those of the corresponding stearate. The following evaluations were made: humidity, hot and cold water, and overcoating (Table III).

*Example 21*

Mixed linseed methyl esters 10.0 g. (approx. 0.03 mole), pyrogallol 20 g. (0.16 mole), and titanium isopropoxide 0.1 ml. were reacted for 1 hour at 230° C. Molecular distillation as in Example 20 yielded 4.2 g. of a red oil $n_D^{17}$ 1.5140; mol. wt. 347. Calcd. for methyl pyrogallyl linoleate: mol. wt. 418. Films dried somewhat slowly but were moderately hard.

TABLE I.—EVALUATION OF Fe/GALLATE MODIFIED CASTOR/ALKYD COMPLEX COATING

| Test | Film aged at 25° C. for 48 hours | Stoved (140° C./1 hour) (no prior aging) |
|---|---|---|
| Appearance | Blue-black, glossy and tack-free, flexible | As for unstoved but harder film. Flexible. |
| Film thickness (average) | About 0.0005" corresponding to about 0.3 g. film on a 6" x 4" panel. | As opposite. The film lost about 10% of its weight on stoving. |
| Accelerated weathering (1,000 hours) | A few rust spots developed. Negligible blistering. Film hard and fairly glossy with very good adhesion. | Excellent resistance to test. Film had high gloss, good flexibility and very good adhesion. |
| Humidity cabinet (1,000 hours) | Patches of microblistering over 50% of film area but no apparent rusting beneath blisters. Good adhesion and little noticeable softening. | Result as above. |
| Natural weathering (Paint Research Station roof). | After 2 months (mid November-mid January) some small rust spots were developing. | |
| Cold water, ⅔ immersion (72 hours) | Film showed signs of blushing after a few hours. At end of test, film had badly blistered and softened, with micro-blisters and rust patches. After 24 hours standing film hardened and recovered from blushing. | No apparent breakdown of the film. |
| Boiling water, ⅔ immersion (1 hour) | Microblistering apparent after ¼ hr.—after 1 hr., loss of adhesion and blushing. | Results as above: film not removed by scratching immediately after test. |

TABLE II.—EVALUATION OF Fe/GALLATE-MODIFIED CASTOR/ALKYD COMPLEX COATING

| Test | Film aged at 25° C. for 48 hours | Stoved (140° C./1 hour) (no prior aging) |
|---|---|---|
| Cold alkali, ⅔ immersion (1% NaOH, 4 hrs.) | Very rapid dissolution of film | Less rapid attack of film but resistance only poor. |
| 2% NH₃ atmosphere (2 days) | Microblisters and rust spots; film softened and easily rubbed off 48 hrs. after test; slight recovery of film with respect to hardening and disappearance of blisters. | Microblistering but no rust spots. Temporary slight softening of film followed by good recovery. |
| SO₂ atmosphere (British Standard 1391) | Loss in weight of 6" x 2" panel (53 g.) due to rust = 0.2 g. (cf. control panel (53 g.) lost 2.1 g. as rust). Film blushed and lost gloss. | Loss in weight of 6" x 2" panel (52 g.) = 0.02 g. No blushing or loss of gloss. |
| 4% salt solution, ⅔ immersion (24 hrs.) | Very poor | Slightly better than unstoved in initial stages. |
| Salt spray (72 hrs.) | do | Do. |

*Example 19*

Methyl oleate 34 g. (0.11 mole), pyrogallol 66.4 g. (0.51 mole), and titanium isopropoxide 0.4 ml. were reacted at 230° C. for 1½ hours as previously described. After the reaction product cooled to room temperature, 100 ml. benzene was added to precipitate unreacted excess pyrogallol. After filtration thereof the solution was washed in a separatory funnel with three 100 ml. portions of warm water, and then distilled to remove the benzene. Unreacted methyl oleate 8.4 g. was removed by refluxing with four 100 ml. portions petroleum ether, and the residual solvent removed by warming in vacuo to give 38.5 g. of a black viscous oil which was molecularly distilled at 200° C. and $10^{-3}$ mm. to yield a pale red oil $n_D^{18}$ 1.504; mol. wt. 406; active hydrogen atoms (Zerevitinoff) 2.8. Calcd. for methyl pyrogallyl stearate: mol. wt. 422; active hydrogen atoms 3.0. Films brushed onto acetone-cleaned emery-abraded mild steel from a 40 percent solution in ethylene glycol monoethyl ether dried rapidly to give a tack-free but fairly soft blue-black film.

*Example 20*

Methyl undecanoate 58 g. (0.29 mole), pyrogallol 75 g. (0.59 mole), and titanium isopropoxide 0.5 ml. were reacted and the product (75 g.) purified as described for TABLE III.—EVALUATION OF Fe/METHYL PYROGALLYL UNDECANOATE COATING

| Test | Result |
|---|---|
| Immersion in cold water for 24 hours. | No apparent effect. |
| Three-quarter immersion in hot water. | Film showed signs of softening and tended to rub off easily. |
| Humidity Cabinet | A few small isolated rust spots appeared after 125 hrs. After 250 hrs. there was significant breakdown of the coating but the bulk of the panel area beneath the coating had not rusted. |
| Overcoating with a long oil alkyd-rutile TiO₂ paint. | Drying of the top coat was inhibited. |

TABLE IV.—COMPATIBILITY OF METHYL PYROGALLYL UNDECANOATE WITH POLYMERS

| Polymer | Compatibility |
|---|---|
| Shellac in ethylene glycol monoethyl ether. | Completely compatible giving a hard tack-free black film. |
| Polyvinyl chloride/acetate in methyl ethyl ketone/toluene. | Incompatible. |
| Chlorinated rubber in methyl ethyl ketone. | Do. |

TABLE V.—APPLICATION OF OVERCOATS ON THE Fe GALLATE/CASTOR ALKYD COMPEX COATING

| Medium | Unstoved iron complex | Stoved iron complex |
|---|---|---|
| (a) Drying oil type: | | |
| (i) Alkyd paints/non reactive pigment e.g., long oil alkyd/TiO$_2$ rutile; tung phenolic/micaceous iron oxide; tung phenolic/aluminum. | Loss of drying properties of top coat. | Paints dry normally. Good intercoat adhesion. |
| (ii) Alkyd paints/reactive pigments, e.g., zinc chromate/long oil alkyd or tung phenolic. | Negligible loss of drying properties. Good intercoat adhesion. | Do. |
| (b) Other media: | | |
| (i) P.V.A./TiO$_2$ emulsion paint. | Good intercoat adhesion. | As for unstoved. |
| (ii) Chlorinated rubber/red iron oxide. | No difficulty in application (i.e. no attack on iron complex by strong lacquer solvents). Good intercoat adhesion. | Do. |
| (iii) Polyvinyl chloride/acetate/TiO$_2$ lacquer. | No difficulty in application (as in b(ii)). Poor intercoat adhesion. | Do. |
| (iv) Polyvinyl chloride/zinc chromate lacquer. | Poor intercoat adhesion (i.e., no improvement as expected via interaction of zinc chromate and polyhydric phenol residues in undercoat). | Do. |

TABLE VI.—COMPATIBILITY OF GALLATE MODIFIED CASTOR ALKYD WITH OTHER POLYMERS

| Polymer | Comments |
|---|---|
| Shellac (in Cellosolve) | Compatible—Mixture in Cellosolve gave hard, tack-free blue-black complex on mild steel. |
| Polyvinyl chloride/acetate (in M.E.K./toluene). | Incompatible with Cellosolve solution of gallate/alkyd. |
| Chlorinated rubber (in methyl isobutyl ketone). | Do. |

TABLE VII.—EVALUATION OF Fe/GALLATE-MODIFIED CASTOR OIL COMPLEX COATING

| Test | Film aged at 25° C. for 7 days | Stoved (140° C./1 hour) (no prior aging) |
|---|---|---|
| Appearance | Blue-black, glossy and tack free. | As for unstoved but harder. |
| Humidity (1,000 hours) | Very good protection—only traces of corrosion under microblisters. | The coating performance in both tests was notably improved. |
| Accelerated weathering (1,000 hours) | Very good protection—a few small rust spots noted and traces of microblistering. | |
| Natural weathering on P.R.S. roof | After 3 months—very slight rusting. After 4½ months, small rust patches noted. | No tests carried out. |
| Water: | | |
| Cold (3 days) | No effect. | No effect. |
| Boiling (1 hour) | do | Do. |
| NaOH: | | |
| Cold 1% | After 2 hours the film was changing color and softening with reduction in adhesion. No rusting. After 4 hours the film was soft and easily removed. | After 2 hours small amount of blistering. After 3 hours film softened around blisters and was easily removed (20% of area) but no rusting beneath blisters. |
| Boiling 0.2% (¼ hour) | Slight softening and loss of adhesion over a small part of the film area. | No effect. |
| 2% NH$_3$ atmosphere (2 days) | Microblistering and softening—recovery good. | Relatively less affected than unstoved. |
| Salt spray (1 week) | | Very appreciable corrosion—large rust spots over 30% of area. |

TABLE VIII.—EVALUATION OF Fe/GALLATE-MODIFIED LINSEED/TUNG ALKYD COMPLEX COATING

| Test | Film aged at 25° C. for 7 days | Stoved (140° C./1 hour) (no prior aging) |
|---|---|---|
| Appearance | Blue-black, tack-free film (glossy over abraded steel but matt on grit blasted steel). | As for unstoved but harder—some lightening of color noted in some panels. |
| Humidity (1,000 hours) | Very good protection—small patches over >10% of area of microblistering and traces of corrosion. | Excellent resistance to test. |
| Natural weathering (P.R.S. roof) | After 4 months very good protection—no rust spots.[1] | |
| Accelerated weathering (1,000 hours) | Result as above. | Very good protection—a few small patches of rusting (>10% of area). |
| Water, ⅔ immersion: | | |
| Cold (3 days) | No apparent effect. | No effect. |
| Boiling (1 hour) | Slight softening but no microblistering; no permanent loss of adhesion. | Result as above. |
| NaOH, ⅔ immersion: | | |
| Cold 1% (4 hours) | After 3 hours extensive color change (black to light brown) noted and loss of adhesion. | Slight microblistering and softening of coating but recovery of adhesion good. Color change noted (black to light brown). |
| Boiling 0.2% (¼ hour) | Slight softening but no blistering—recovery of adhesion excellent. | No blistering observed but slight softening—recovery of adhesion and hardness of coating excellent. |
| 2% NH$_3$ atmosphere (2 days) | Slight softening but no apparent microblistering—recovery of hardness and adhesion excellent. | Very slight microblistering, and film softer after test. Recovery after several hours excellent. |
| Salt spray, 4% (1 week) | Performance of several panels tested varied from poor to fairly good. In best case about 25% of panel was affected by rust spots—fair amount of filiform corrosion over whole panel. | Loss of adhesion over 25% of area with rust beneath—fair amount of filiform corrosion. A duplicate panel was much less affected during this time but showed filiform corrosion; more rapid breakdown observed during 3 days further testing. |
| 4% Salt solution immersion (3 days) | After 2 days 2 fairly large patches of rust had appeared; at end of test, very significant blistering noted. | Signs of microblistering over relatively small area after 1 day; blistering gradually increased during test with rusting beneath blisters. |

[1] Mid September 1963–Mid January 1964.

TABLE IX.—EVALUATION OF Fe/PYROGALLOL-MODIFIED DEHYDRATED CASTOR OIL COMPLEX COATING

| Test | Film aged at 25° C. for 7 days | Stoved (140° C./1 hour) (no prior aging) |
|---|---|---|
| Appearance | Blue-black tack free film, relatively soft | Blue-black tack free film, fairly hard. |
| Hardness: | | |
| (a) König-Albert pendulum | 27 secs | 89 secs. |
| (b) Scratch | 1,700 g., fails | 2,000 g., fails. |
| Accelerated weathering (1,000 hours) | A few micro-rust spots visible | A few micro-rust spots visible. |
| Humidity Cabinet (1,000 hours) | Several small rust spots appeared after 500 hours, half the surface covered after 1,000 hours. | No effect. |
| Natural weathering on P.R.S. roof | After 3 months—very slight rusting. After 4½ months—small rust patches noted. | After 4½ months—very slight rusting. |
| Cold water, ⅔ immersion for 3 days | Coating somewhat softened | Slight bloom. |
| Gently boiling water, ⅔ immersion for 1 hour | Coating became soft and sticky | No effect. |
| Cold 1% NaOH solution, ⅔ immersion for 4 hours. | Coating became detached over 75% of the surface. | Coating became detached over 50% of the surface. |
| Gently boiling 0.2% NaOH ⅔ immersion for 15 mins. | Coating softened | Slight dissolution along water/air interface. |
| 2% Ammonia atmosphere (2 days) | Some microblisters formed after 2 days, whole film became brittle. | Microblistering after 2 days, coating became brittle. |
| Salt spray | Coating completely detached after 7 days | Break-down of coating started after 8 days, becoming completely detached after 16 days. |

TABLE X.—EVALUATION OF Fe/PYROGALLOL-MODIFIED LINSEED OIL COMPLEX COATING

| Test | Film stoved (140° C./1 hour) (no prior aging) |
|---|---|
| Appearance | Blue-black, tack free, hard film. |
| Hardness: | |
| (a) König-Albert pendulum | 81 seconds. |
| (b) Scratch | Fails, 2,100 g. |
| Humidity (1,000 hours) | Very good protection, a very few microblisters. |
| Accelerated weathering (1,000 hrs.) | Very good protection, no effect. |
| Natural weathering on P.R.S. roof | After 4 months—very slight rusting. |
| Water: | |
| Cold (3 days) | No effect. |
| Boiling (1 hour) | Do. |
| NaOH: | |
| Cold 1% (4 hours) | Surface wrinkled, slight detachment at edges. |
| Boiling 0.2% (¼ hour) | No effect. |
| 2% NH₃ atmosphere (2 days) | Microblistering noted. |
| Salt spray (7 days) | Coating showing initial signs of loss of adhesion. |

We claim:

1. A process for obtaining high yields of polyhydroxy phenol-substituted vegetable oil based media, said process comprising heating for about 2–4 hours at about 150° C. to 230° C. in the presence of a catalyst, a reaction mixture comprising (a) a vegetable oil based member selected from the group consisting of castor oil, hydrogenated castor oil, linseed oil, soybean oil, tung oil, dehydrated castor oil, isomerized safflower oil, methyl oleate, methyl undecenoate, the mixed linseed methyl esters, and a castor-phthalic-glycerol alkyd, and (b) a polyhydroxy phenol selected from the goup consisting of pyrogallol, catechol, methyl gallate, and propyl gallate, with constant removal of byproduct lower alcohol during the alcoholysis that occurs when the said vegetable oil based member is one that contains hydroxyl functionality and the polyhydric phenol is a lower alkyl gallate, said catalyst being selected from the group consisting of acid-activated montmorillonite and a $C_2$–$C_4$ alkoxide of a metal selected from the group consisting of aluminum, titanium, and zirconium.

2. The process of claim 1 wherein the vegetable oil based member is castor oil, the polyhydroxy phenol is methyl gallate, and the catalyst is the $C_3$ alkoxide of titanium.

3. The process of claim 1 wherein the vegetable oil based member is linseed oil, the polyhydroxy phenol is propyl gallate, and the catalyst is the $C_3$ alkoxide of titanium.

4. The process of claim 1 wherein the vegetable oil based member is isomerized safflower oil, the polyhydroxy phenol is propyl gallate, and the catalyst is the $C_3$ alkoxide of aluminum.

5. The process of claim 1 wherein the vegetable oil based member is dehydrated castor oil, the polyhydroxy phenol is pyrogallol, and the catalyst is acid activated montmorillonite.

6. The process of claim 1 wherein the vegetable oil based member is tung oil, the polyhydroxy phenol is pyrogallol, the catalyst is acid-activated montmorillonite, and the temperature is limited to 150° C. to avoid gelation.

7. The process of claim 1 wherein the vegetable oil based member is linseed oil, the polyhydroxy phenol is pyrogallol, and the catalyst is acid activated montmorillonite.

8. The process of claim 1 wherein the vegetable oil based member is methyl undecenoate, the polyhydroxy phenol is pyrogallol, and the catalyst is the $C_3$ alkoxide of titanium.

9. The process of claim 1 wherein the vegetable oil based member is the methyl esters of the linseed oil mixed fatty acids, the polyhydric phenol is catechol, and the catalyst is the $C_3$ alkoxide of titanium.

10. The process of claim 1 wherein the vegetable oil based member is the mixed methyl esters of the linseed oil fatty acids, the polyhydroxy phenol is pyrogallol, and the catalyst is the $C_3$ alkoxide of titanium.

11. The process of claim 1 wherein the vegetable oil based member is a castor/phthalic glycerol alkyd, the polyhydroxy phenol is methyl gallate, and the catalyst is the $C_3$ alkoxide of titanium.

12. Self-curing coating compositions for application to freshly abraded ferrous and unoxidized mild steel surfaces, said compositions comprising a 20–40 percent by weight solution of a polyhydroxy phenol-substituted vegetable oil based medium selected from the group consisting of gallate-modified castor oil, pyrogallol-modified dehydrated castor oil, pyrogallol-modified linseed oil, a gallate-modified castor/phthalic/glycerol alkyd, methyl pyrogallyl stearate, methyl pyrogallyl undecanoate, and methyl pyrogallyl linoleate in a volatile glycol ether solvent selected from the group consisting of ethylene glycol monoethyl ether and diethylene glycol butyl ether, and as additives therefor a high boiling aromatic naphtha and 1 percent based on the weight of the glycol ether of acetic acid.

13. A composition according to claim 12 wherein the substituted vegetable oil based medium is a gallate modified castor oil, the glycol ether is ethylene glycol monoethyl ether, and the concentration of the said modified oil in the ether is 25 percent.

14. A composition according to claim 12 wherein the substituted vegetable oil based medium is a pyrogallol modified dehydrated castor oil and the glycol ether is ethylene glycol monoethyl ether.

15. A composition according to claim 12 wherein the substituted vegetable oil based medium is a gallate modified castor oil/phthalic/glycerol alkyd, the glycol ether is ethylene glycol monoethyl ether, and the concentration of the said alkyd in the ether is 25 percent.

16. A composition according to claim 12 wherein the substituted vegetable oil based medium is methyl pyrogallyl stearate, the glycol ether is ethylene glycol monoethyl ether, and the concentration of the said stearate in the said glycol ether is 40 percent.

17. A composition according to claim 12 wherein the substituted vegetable oil medium is methyl pyrogallyl undecanoate and the glycol ether is ethylene glycol monoethyl ether.

18. A composition according to claim 12 wherein the substituted vegetable oil medium is pyrogallol-modified linseed oil and the glycol ether is ethylene glycol monoethyl ether.

19. A composition according to claim 12 wherein the substituted vegetable oil medium is methyl pyrogallyl linoleate and the glycol ether is ethylene glycol monoethyl ether.

20. A clean ferrous surface having applied thereto a coating of a composition as defined in claim 12.

21. A process for promoting the in situ formation of sufficient Fe complex for tack-free curing of films of a polyhydroxy phenol-substituted vegetable oil medium selected from the group consisting of gallate-modified castor oil, pyrogallol-modified dehydrated castor oil, a gallate-modified castor/phthalic/glycerol alkyd, methyl pyrogallyl stearate, methyl pyrogallyl undecanoate, and methyl pyrogallyl linoleate comprising forming a 20–40 percent by weight solution of a said medium in a volatile glycol ether, adding to said solution sufficient high boiling aromatic naphtha to eliminate any cloudiness and about 1 percent by weight of acetic acid based on the weight of the glycol ether, and applying a thin coating of the final solution to a freshly cleaned ferrous surface.

References Cited by the Examiner

UNITED STATES PATENTS

| | | | |
|---|---|---|---|
| 1,954,627 | 4/1934 | Jirousek | 260—22 |
| 2,722,521 | 11/1955 | Shaw et al. | 260–22 |
| 2,967,840 | 1/1961 | Phillips et al. | 260—22 |
| 3,039,980 | 6/1962 | Mallison | 260—22 |
| 3,055,869 | 9/1962 | Wilson et al. | 260—22 |

FOREIGN PATENTS 826,564 1/1960 Great Britain.

OTHER REFERENCES

Bito et al.: Chemical Abstracts, vol. 55, No. 3, Feb. 6, 1961, pages 3110i–3111a.

LEON J. BERCOVITZ, *Primary Examiner.*

R. W. GRIFFIN, *Assistant Examiner.*